H. A. BARNARD.
Wheat Separator.

No. 48,890. Patented July 25, 1865.

Witnesses

Signature of
Inventor Lost

UNITED STATES PATENT OFFICE.

H. A. BARNARD, OF MOLINE, ILLINOIS.

IMPROVEMENT IN GRAIN-SEPARATORS.

Specification forming part of Letters Patent No. 48,890, dated July 25, 1865.

*To all whom it may concern:*

Be it known that I, H. A. BARNARD, of Moline, in the county of Rock Island and State of Illinois, have invented certain new and useful Improvements in Wheat-Separators; and I do hereby declare the following to be a full, clear, and exact description of the construction and operation of the same, reference being had to the accompanying drawings, making a part of this specification, in which—

Figure 1:
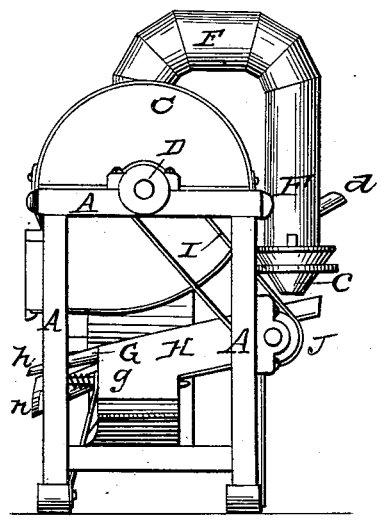
Figure 2:
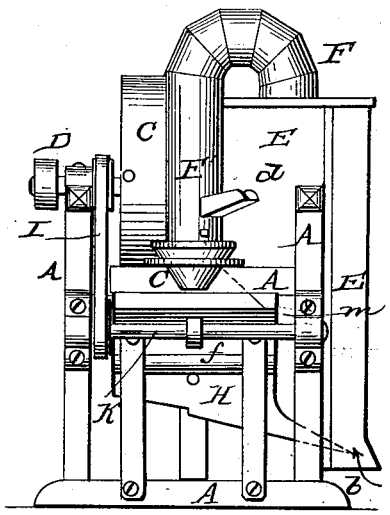
Figure 3:
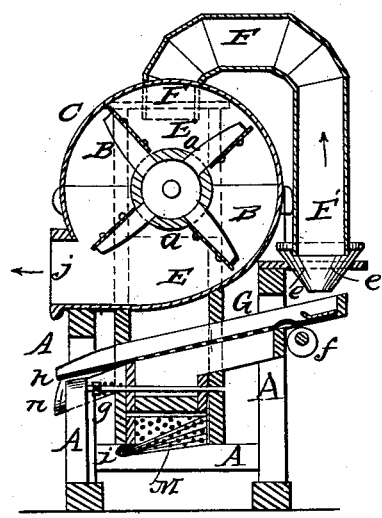

Figure 1 represents an elevation from one of the ends. Fig. 2 represents an elevation from one of the sides; and Fig. 3 represents a vertical longitudinal section through the fan case, and fan, screens, frame, &c.

Similar letters of reference, where they occur in the several separate figures, denote like parts in all the drawings.

The object and purpose of my invention is to more thoroughly separate the wheat from all dust, light chaff, straws, &c., which would otherwise choke the sieves and prevent the oats and sticks from being sifted out, and also prevent any dust from flying about the mill or apartment in which the machine is operated, and then by a second exhaust-blast, though making one continuous operation, thoroughly separate the wheat from all remaining substances—such as shrunk wheat, chess, cockle, smut-balls, small light-oats, and screenings of all kinds; and my invention consists, first, in so arranging an exhaust suction-fan with regard to the air trunks or passages and the exit-openings as that there shall be two separations—one before the wheat enters the oat and stick extractor, and the other after the wheat has passed through the sieves; and my invention further consists in the combined use of an open eccentric and a coiled spring for giving the sieves a light, rapid shake motion without any sudden blow or jerk; and my invention further consists in making the pipe or trunk which carries the feeding-spout adjustable, for facilitating the feeding in or "spouting" of the grain to be cleaned and separated.

To enable others skilled in the art to make and use my invention, I will proceed to describe the same with reference to the drawings.

A represents a frame, at or near the top of which is arranged an exhaust suction-fan, B, inclosed in the fan-case C. This fan may be driven by any fast-moving power through a belt passing over the pulley D on the fan-shaft or otherwise.

Adjoining the fan-case C there is a chamber, E, which communicates with the fan-chamber by an opening, a, Fig. 3, around the eye of the fan-case, and which chamber E has also an opening, b, at its lower end, through which the blast is drawn that performs one part of the separation, as will be hereinafter explained.

From the top of the inclosed chamber E a pipe or trunk, F, extends in a downwardly-curving direction, and terminates in a bowl or conical end, c, through which the grain that is fed into the machine at the spout d passes onto the shaking sieves G. This bowl or funnel c, as more distinctly seen in Fig. 3, is so united to the end of the pipe F as to leave air-space between the two, as shown at e, for the supply of air that makes the first separation at that point, in addition to the current drawn up through the opening in the bottom of the funnel; and for the purpose of facilitating the "spouting" or feeding in of the grain, I make the section F' of the pipe F, to which the spout d is attached, adjustable, so that that section may be turned around toward the grain to be fed in. This first separation before the wheat enters the oat and stick extractor removes all dust, light chaff, straws, &c., which would otherwise choke the sieves, and prevent the oats and sticks from being sifted out, and it further prevents any dust from escaping into the mill or apartment where the machine is used. The wheat and other material thus partially separated falls upon the sieve G, which has a light rapid motion given to it, and to the shoe or frame H in which it is placed or hung, as follows: A belt, I, passing around a pulley on the fan-shaft, also passes around a pulley, J, on a shaft, K, and on this shaft there is an eccentric, f, that works against the shoe or sieve-frame H, forcing it in one direction, while a coiled spring, g, returns it in an opposite direction, and the spring g also keeps the frame or shoe H constantly in contact with the cam, so that however fast the cam-shaft may be run, there is no sudden blow or jar given to the sieves, which would, if allowed, prevent a thorough separation, as the material would be jumped over and upon the sieves. A shake motion has heretofore been given by a cam inclosed in a box or yoke; but when thus inclosed it collects dirt and grit, and makes much friction and consequent wearing of parts. My open cam and coiled spring avoids both dirt and friction. The shoe H for easy and rapid vibration is set upon spring or yielding legs or supports L. The oats, sticks, &c., being separated from the grain and other material still remaining with the wheat passes off from the end $h$ of the sieve G, while the smaller material passing through the sieve G drops upon a second sieve or screen, M, where the shrunk wheat, chess, cockle, smut-balls, small light oats, and screenings passing through said screen M runs off or out at $i$, while the wheat is conducted, as shown in Fig. 1, into the trunk E, up through which, as heretofore stated, a strong exhaust suction-blast is drawn sufficient to separate everything lighter than the wheat from it, and carry it up and out through the fan-case, the wheat dropping out at $b$. The material separated at the feeding-in point is drawn by the same exhaust-blast up through the pipe F, and out at the fan-case opening $j$, whence it may be carried out of the mill. Thus by one fan I have two separations, which materially improves the process of cleaning the wheat.

In the air-chamber E and at the point $m$, Fig. 2, there is an eddy or calm, where the separated impurities or light grains may fall and accumulate, and whence they may be taken or may pass through a hinged door and into a spout, $n$, and thence to any convenient deposit.

Having thus fully described the nature, object, and purpose of my invention, what I claim therein as new, and desire to secure by Letters Patent, is—

1. The arranging a suction-fan, B, between the air-trunk F and the screen and shaking-shoe, and in relation to the inlet and exit passages thereof, so that two separations of the grain from its impurities shall take place, while the grain has one continuous path through the machine, substantially as herein described and represented.

2. The combined use of an open cam or eccentric and a coiled spring for giving a light but rapid shake motion to the sieves, substantially as herein described and represented.

3. Making the pipe or trunk which carries the feeding-spout $d$ adjustable, so that it may be turned in either direction to facilitate the "spouting" or feeding in of the grain to be cleaned and separated, substantially as described.

H. A. BARNARD.

Witnesses:
R. L. BROWN,
ELSWORTH MAPES.